US012705964B2

(12) United States Patent
Kim et al.

(10) Patent No.: US 12,705,964 B2
(45) Date of Patent: Aug. 11, 2026

(54) PTZ CAMERA OPERATING SYSTEM

(71) Applicant: IDIS CO., LTD., Daejeon (KR)

(72) Inventors: Hyunbin Kim, Seongnam-si (KR); Chan Hee Shin, Seoul (KR)

(73) Assignee: IDIS CO., LTD., Daejeon (KR)

( * ) Notice: Subject to any disclaimer, the term of this patent is extended or adjusted under 35 U.S.C. 154(b) by 34 days.

(21) Appl. No.: 18/898,591

(22) Filed: Sep. 26, 2024

(65) Prior Publication Data

US 2025/0218264 A1 Jul. 3, 2025

(30) Foreign Application Priority Data

Dec. 28, 2023 (KR) ........................ 10-2023-0194090

(51) Int. Cl.
*G08B 13/196* (2006.01)

(52) U.S. Cl.
CPC ... *G08B 13/1968* (2013.01); *G08B 13/19602* (2013.01); *G08B 13/19628* (2013.01); *G08B 13/1963* (2013.01)

(58) Field of Classification Search
CPC .......... G08B 13/1968; G08B 13/19602; G08B 13/19628; G08B 13/1963; H04N 7/18
USPC ..................................................... 348/211.99
See application file for complete search history.

(56) References Cited

U.S. PATENT DOCUMENTS

2013/0021433 A1* 1/2013 Belsarkar ......... G08B 13/19682
348/36

FOREIGN PATENT DOCUMENTS

| | | | |
|---|---|---|---|
| KR | 10-2011-0023472 | A | 3/2011 |
| KR | 10-1421700 | B1 | 7/2014 |
| KR | 10-2016-0072617 | A | 6/2016 |
| KR | 10-2017-0064300 | A | 6/2017 |
| KR | 10-2018-0101165 | A | 9/2018 |
| KR | 10-2193984 | B1 | 12/2020 |

* cited by examiner

*Primary Examiner* — Joel W Fosselman

(57) ABSTRACT

Disclosed is a PTZ camera operating system capable of easily and simply setting and monitoring a surveillance area through a user-intuitive surveillance area setting UI capable of setting the surveillance area from a hemispherical fisheye image generated using individual images within a motion range captured by a PTZ camera.

9 Claims, 6 Drawing Sheets

SURVEILLANCE AREA SETTING UI

SURVEILLANCE AREA SETTING UI

SURVEILLANCE AREA SETTING UI

PTZ CAMERA OPERATING SYSTEM

CROSS-REFERENCE TO RELATED APPLICATION(S)

This application claims priority from Korean Patent Application No. 10-2023-0194090, filed on Dec. 28, 2023, in the Korean Intellectual Property Office, the disclosure of which is incorporated herein by reference in its entirety.

BACKGROUND OF THE INVENTION

Field of the Invention

The present invention relates to a pan-tilt-zoom (PTZ) camera capable of changing a surveillance direction and enlarging/reducing a surveillance image, and more particularly to a PTZ camera operating system.

Description of the Related Art

Korean Patent No. 10-2193984 (announced on Dec. 22, 2020) previously filed and registered by the applicant of the present invention proposed a surveillance system that controls a PTZ camera using a fisheye camera while the fisheye camera and the PTZ camera are installed adjacent to each other, thereby automatically controlling a panning angle, a tilt angle, and a zooming distance of the separate PTZ camera easily using an image of the fisheye camera without a separate and cumbersome calibration process.

This technology has a complicated surveillance system configuration and inevitably increases system operation costs since the fisheye camera and the PTZ camera are installed adjacent to each other. Therefore, the inventor has conducted research on technology that efficiently sets and monitors a surveillance area using only the PTZ camera, so that the system configuration is easy, and system operation costs may be reduced.

SUMMARY OF THE INVENTION

Therefore, the present invention has been made in view of the above problems, and it is an object of the present invention to provide a PTZ camera operating system capable of easily and simply setting and monitoring a surveillance area through a user-intuitive surveillance area setting user interface (UI) capable of setting a surveillance area from a hemispherical fisheye image generated using individual images within a motion range captured by a PTZ camera.

In accordance with the present invention, the above and other objects can be accomplished by the provision of a PTZ camera operating system including a nonvolatile memory configured to store a hemispherical fisheye image generated using individual images within a motion range captured by a PTZ camera, a processor configured to execute a surveillance area setting UI for setting a surveillance area using the hemispherical fisheye image stored in the nonvolatile memory, a display unit configured to output a surveillance area setting UI executed by the processor to a screen, a user input unit configured to receive input of a user operation for setting the surveillance area, a communication unit configured to communicate with the PTZ camera, wherein the surveillance area setting UI outputs the hemispherical fisheye image stored in the nonvolatile memory to the screen, and sets, as the surveillance area, an area selected through the user operation from the hemispherical fisheye image output to the screen.

According to an additional aspect of the present invention, the surveillance area setting UI may set the surveillance area using a grid setting method of overlaying grids for selection of the surveillance area through a user operation on the hemispherical fisheye image and setting, as the surveillance area, a fisheye image area including the grids overlayed on the hemispherical fisheye image.

According to an additional aspect of the present invention, the surveillance area setting UI may set the surveillance area using a polygon setting method of overlaying a polygon for selection of the surveillance area through a user operation on the hemispherical fisheye image and setting, as the surveillance area, a fisheye image area in the polygon selected by moving vertices of the polygon.

According to an additional aspect of the present invention, the processor may include a fisheye image generator configured to generate a hemispherical fisheye image using individual images within the motion range captured by the PTZ camera, a fisheye image storage controller configured to perform a control operation to store the hemispherical fisheye image generated by the fisheye image generator in the nonvolatile memory, a surveillance area setting UI output controller configured to perform a control operation to output the surveillance area setting UI for setting the surveillance area through the display unit, a coordinate mapping processor configured to generate a PTZ camera driving table by mapping fisheye image coordinates included in the surveillance area set by the surveillance area setting UI to PTZ camera driving coordinates, and a camera driving table storage controller configured to perform a control operation to store the PTZ camera driving table generated by the coordinate mapping processor in the nonvolatile memory.

According to an additional aspect of the present invention, the processor may further include a camera driving controller configured to control driving of the PTZ camera.

According to an additional aspect of the present invention, the camera driving controller may capture individual images of each driving area while panning and tilting the PTZ camera in a zoom state at a specific magnification within the motion range.

According to an additional aspect of the present invention, the fisheye image generator may combine individual images of each driving area, and distort a planar image obtained by connecting overlapping areas of the individual images using an inverse matrix of a fisheye image generation matrix to generate a hemispherical fisheye image.

According to an additional aspect of the present invention, the processor may capture a surveillance area image in real time by performing a driving control to pan/tilt the PTZ camera to the surveillance area set by the surveillance area setting UI through the camera driving controller.

According to an additional aspect of the present invention, the processor may further include an event detector configured to detect a motion event by analyzing in real time a surveillance area image captured in real time by the PTZ camera panned and tilted in real time in the surveillance area.

According to an additional aspect of the present invention, the processor may pan-tilt the PTZ camera and zoom the PTZ camera at a preset magnification at the same time using the camera driving controller, thereby capturing an enlarged image centered on coordinates where a motion event is detected when the motion event is detected by the event detector.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
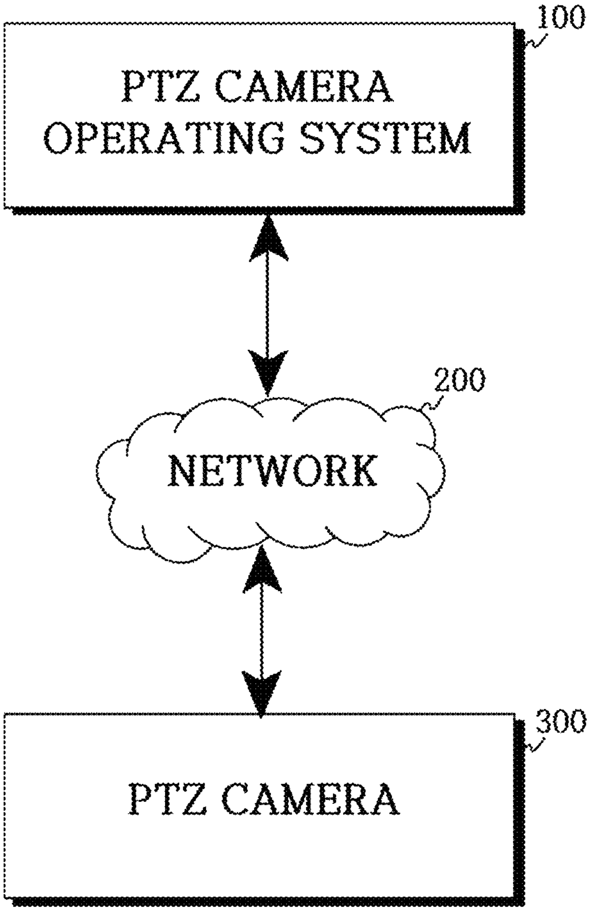
FIG. 1 is a schematic view of a PTZ camera operating system according to the present invention.

Hereinafter, the present invention will be described in detail through preferred embodiments described with reference to the attached drawings so that those skilled in the art may easily understand and reproduce the embodiments. Even though specific embodiments are illustrated in the drawings and related detailed descriptions are given, the specific embodiments are not intended to limit various embodiments of the present invention to any particular form.

In describing the present invention, when it is determined that a detailed description of a related known function or configuration may unnecessarily obscure the gist of the embodiments of the present invention, the detailed description will be omitted.

When a component is mentioned as being "coupled" or "connected" to another component, it is understood that the component may be directly coupled or connected to another component, and yet another component may be present therebetween.

On the other hand, when a component is mentioned as being "directly coupled" or "directly connected" to another component, it should be understood that there are no other components therebetween.

FIG. 1 is a schematic view of a PTZ camera operating system according to the present invention. As illustrated in FIG. 1, the PTZ camera operating system 100 according to the present invention is connected to a PTZ camera 300 via a network 200 using wired or short-range wireless connection.

The PTZ camera operating system 100 according to the present invention easily and simply sets and monitors a surveillance area through a user-intuitive surveillance area setting UI capable of generating a hemispherical fisheye image using individual images within a motion range captured by the PTZ camera 300 connected through the network 200 and setting the surveillance area from the generated hemispherical fisheye image.

Figure 2:
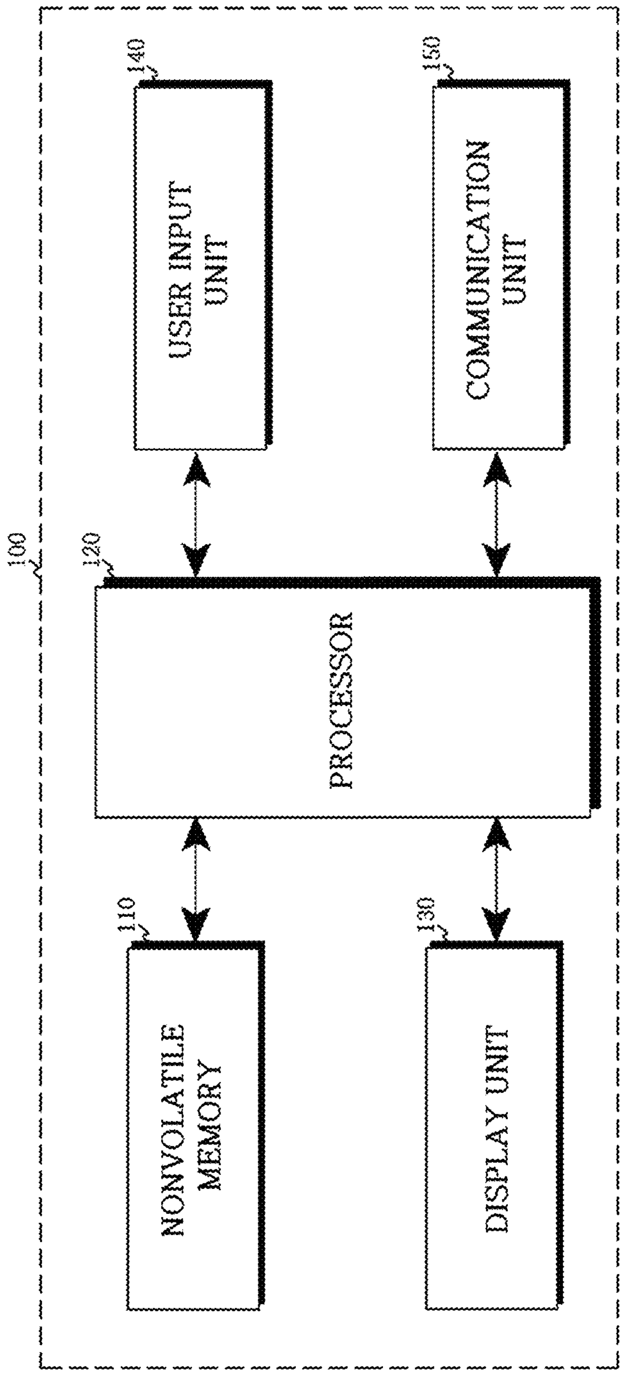
FIG. 2 is a block diagram illustrating a configuration of an embodiment of the PTZ camera operating system according to the present invention.

FIG. 2 is a block diagram illustrating a configuration of an embodiment of the PTZ camera operating system according to the present invention. As illustrated in FIG. 2, the PTZ camera operating system 100 according to this embodiment includes a nonvolatile memory 110, a processor 120, a display unit 130, a user input unit 140, and a communication unit 150.

The nonvolatile memory 110 stores a hemispherical fisheye image generated using individual images within a motion range captured by the PTZ camera 300 and an operating system (OS). For example, the nonvolatile memory 110 may be an EEPROM or a flash memory, but is not limited thereto.

The processor 120 executes an OS and executes a surveillance area setting UI that sets a surveillance area using a hemispherical fisheye image stored in the nonvolatile memory 110 under the OS. For example, the processor 120 may be a single core processor or a multicore processor having at least two cores.

The display unit 130 outputs the surveillance area setting UI executed by the processor 120 on a screen. For example, the display unit 130 may be a display of an LCD, LED, or OLED type, but is not limited thereto.

The user input unit 140 receives user operations for setting the surveillance area. For example, the user input unit 140 may be at least one of a keyboard, a mouse, or a touch panel, but is not limited thereto.

The communication unit 150 communicates with the PTZ camera 300. For example, the communication unit 150 may be a wired communication module for TCP/IP-based wired Ethernet connection or a wireless communication module for short-range wireless communication connection such as Bluetooth or Wi-Fi, but is not limited thereto.

In this instance, the surveillance area setting UI outputs the hemispherical fisheye image stored in the nonvolatile memory 110 to the screen through the display unit 130 and sets, as a surveillance area, an area selected through user operation input by the user input unit 140 from the hemispherical fisheye image output to the screen, so that a user-intuitively, easily, and simply sets the surveillance area.

For example, the surveillance area setting UI may be implemented to set the surveillance area using a grid setting method of overlaying grids for selection of the surveillance area through user operation on the hemispherical fisheye image and setting, as the surveillance area, a fisheye image area including the grids overlayed on the hemispherical fisheye image.

Figure 3:
FIG. 3 is a drawing illustrating that the PTZ camera operating system according to the present invention sets a surveillance area using a grid setting method through a surveillance area setting UI.

FIG. 3 is a drawing illustrating that the PTZ camera operating system according to the present invention sets the surveillance area using the grid setting method through the surveillance area setting UI. Referring to FIG. 3, it can be seen that the surveillance area setting UI overlays grids for selection of the surveillance area through user operation on the hemispherical fisheye image and sets, as the surveillance area, a fisheye image area including the grids overlayed on the hemispherical fisheye image.

Alternatively, the surveillance area setting UI may be implemented to set the surveillance area using a polygon setting method of overlaying a polygon for selection of the surveillance area through user operation on the hemispherical fisheye image and setting, as the surveillance area, a fisheye image area in the polygon selected by moving vertices of the polygon.

Figure 4:
FIG. 4 is a drawing illustrating that the PTZ camera operating system according to the present invention sets a surveillance area using a polygon setting method through the surveillance area setting UI.

FIG. 4 is a drawing illustrating that the PTZ camera operating system according to the present invention sets a surveillance area using the polygon setting method through the surveillance area setting UI. Referring to FIG. 4, it can be seen that the surveillance area setting UI overlays a polygon for selection of the surveillance area through user operation on the hemispherical fisheye image and sets, as the surveillance area, a fisheye image area in the polygon selected by moving vertices of the polygon.

Through such implementation, the present invention may set easily and simply a surveillance area through the user-intuitive surveillance area setting UI capable of setting a surveillance area from a hemispherical fisheye image generated using individual images in a motion range captured by a PTZ camera without using a fisheye camera.

Figure 5:
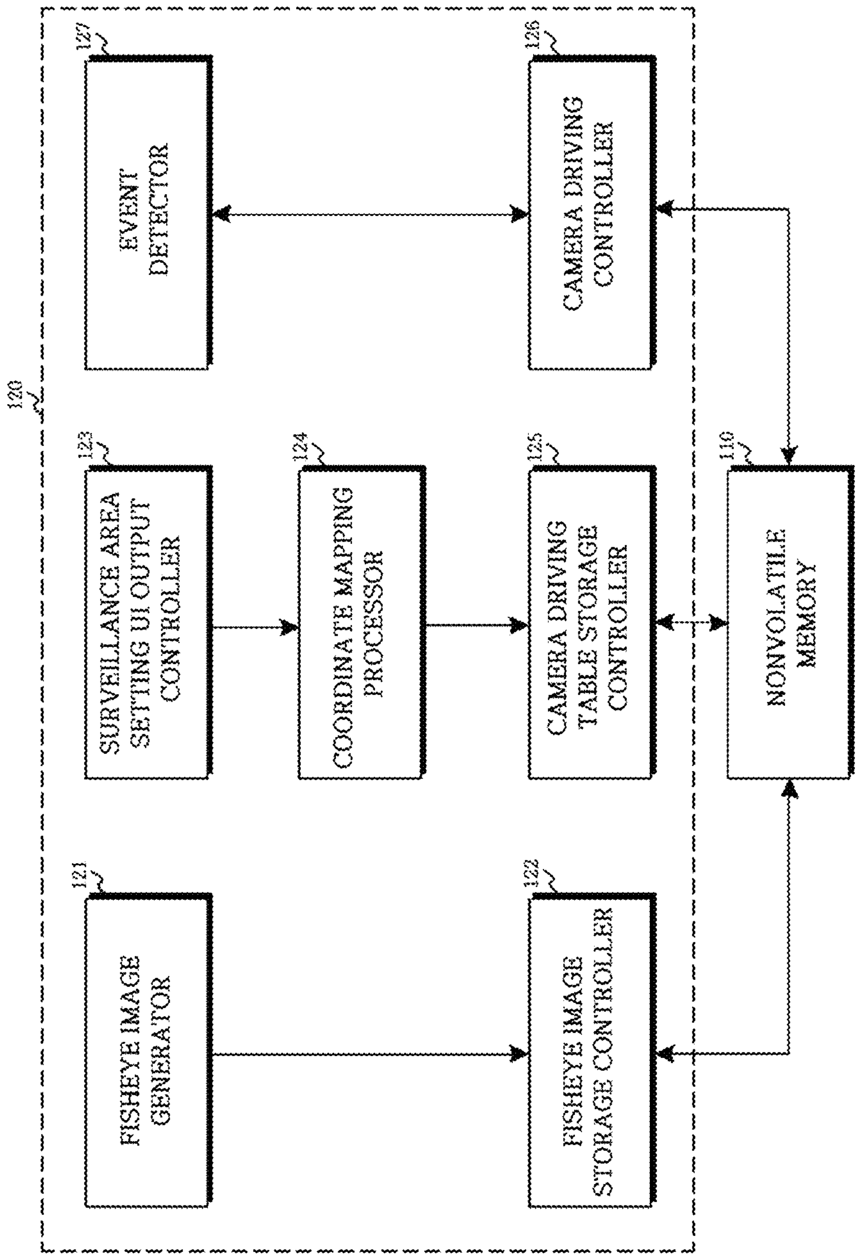
FIG. 5 is a block diagram illustrating a configuration of an embodiment of a processor of the PTZ camera operating system according to the present invention.

FIG. 5 is a block diagram illustrating a configuration of an embodiment of the processor of the PTZ camera operating system according to the present invention. As illustrated in FIG. 5, the processor 120 includes a fisheye image generator 121, a fisheye image storage controller 122, a surveillance area setting UI output controller 123, a coordinate mapping processor 124, and a camera driving table storage controller 125 implemented in software.

The fisheye image generator 121 generates a hemispherical fisheye image using individual images in the motion range captured by the PTZ camera 300.

For example, the fisheye image generator 121 may be implemented so that individual images of each driving area are combined, and a planar image obtained by connecting overlapping areas of the individual images is distorted using an inverse matrix of a fisheye image generation matrix to generate a hemispherical fisheye image.

FIG. 6 is a diagram illustrating an embodiment for describing that a planar image, which is obtained by connecting overlapping individual images captured by the PTZ camera using the fisheye image generator of the PTZ camera operating system according to the present invention, is distorted to generate a hemispherical fisheye image.

Figure 6A:
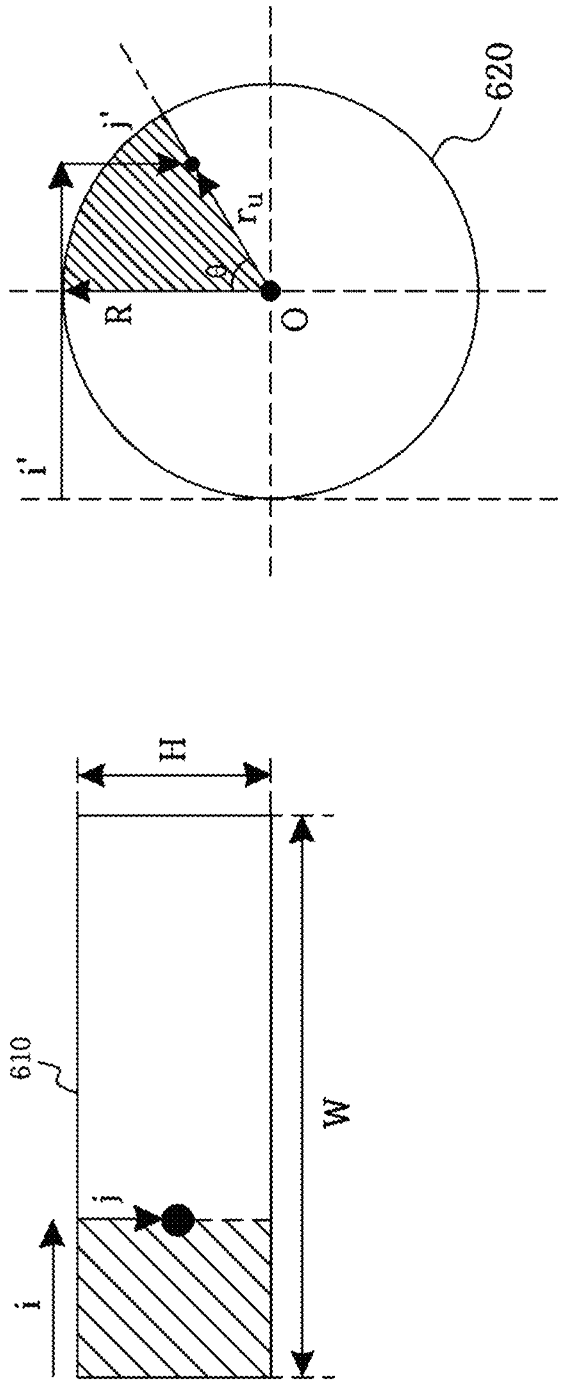
FIGS. 6A and 6B are diagrams illustrating an embodiment for describing that a planar image, which is obtained by connecting overlapping individual images captured by a PTZ camera using a fisheye image generator of the PTZ camera operating system according to the present invention, is distorted to generate a hemispherical fisheye image.

A left rectangular area 610 of FIG. 6A illustrates data obtained by synthesizing individual images in the motion range captured by the PTZ camera. (i, j) coordinates of a synthesis image (planar image obtained by combining individual images) having a width W and a height H may be used to obtain a distance $r_u$ from a center of a fisheye image 620 having a radius R, and a pan angle θ as in the following Formula 1.

$$\theta = i/W * 360 \qquad r_u = R(1 - j/H) \tag{Formula 1}$$

When total pixels of the fisheye image are F*F, (i', j') coordinates of the fisheye image may be obtained as in the following Formula 2.

$$i' = F/2 + r\cos\theta \qquad j' = F/2 - r\sin\theta \tag{Formula 2}$$

Figure 6B:
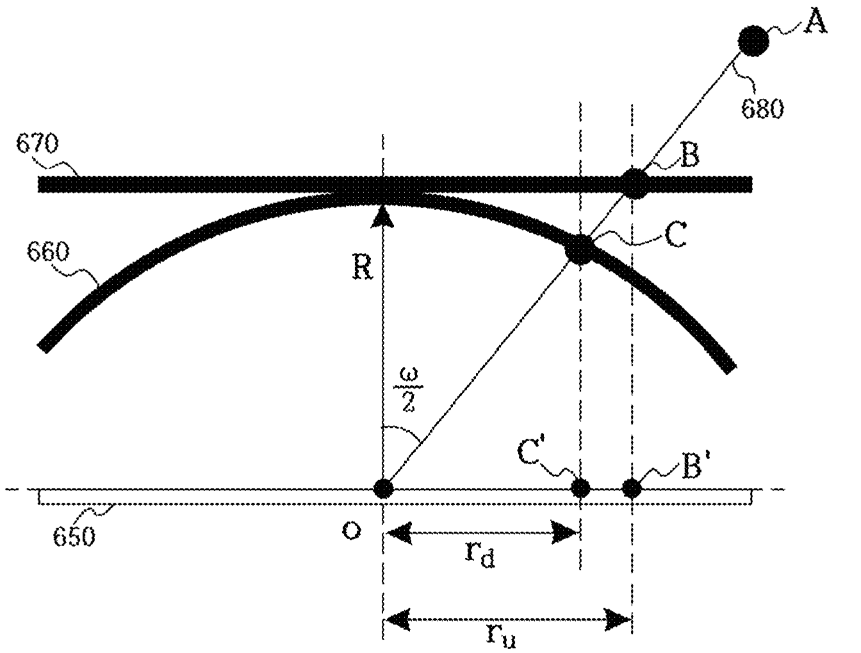

FIG. 6B is a conceptual diagram illustrating another embodiment of converting a PTZ camera image into a fisheye image. The PTZ camera image may be converted into a fisheye image using a field of view (FOV) model. A position where an external point A forms an image on a sensor surface is located on a straight line 680 passing through the external point A and a center O of a camera. In a pinhole model, the point A forms an image at a point B where the straight line 680 intersects an image plane 670 at a position of a focal length R. In other words, a distance $r_u$ from a center to an undistorted image on an image sensor 650 corresponds to a distance from the center O to the point B on the plane or a point B' projected onto the sensor.

In the FOV model, in the case of a fisheye lens, an image is formed at a point C' obtained by projecting a point C where the straight line 680 intersects a sphere 660 having a radius R on the image sensor 650. In this instance, on the image sensor 650, a distance $r_d$ from the center O to the spherically distorted image C' may be obtained using the following Formula 3.

$$r_d = \frac{1}{\omega}\arctan\left(2r_u\tan\frac{\omega}{2}\right) \tag{Formula 3}$$

Here, ω denotes a distortion coefficient indicating a degree of distortion. When the fisheye lens is used, the distortion coefficient ω may be estimated by minimizing an error function for the distortion coefficient ω. When the PTZ camera is used, a tilt angle may be used for the distortion coefficient ω of the fisheye image.

High-resolution image synthesis requires a lot of computational resources. For example, when a PTZ camera having a horizontal FOV of 56 degrees and a vertical FOV of 35 degrees is used, a pan angle interval may be 45 degrees and a tilt angle interval may be 25 degrees to capture the entire surveillance area without gaps, up to 100 degrees.

Since the entire area has a pan angle of 360 degrees, 8 images are required horizontally, and 4 images are required vertically for a tilt angle range of 117.5 degrees (=100 degrees+35 degrees/2). In other words, approximately 32 images (=8*4) are required for the entire surveillance range. In the case of a 2 M (1920*1080) image, a significantly large number of operations, 2 M*32=64 M, is required for image synthesis and conversion.

In order to reduce the amount of computation and memory usage when generating the fisheye image, it is possible to use a method of matching pixels of an image captured by the PTZ camera to pixels of the fisheye image. Since the pixels of the fisheye image of a size 1000*1000 are 785 k (=$\pi$*500$^2$), not only may computational resources be saved by reducing the number of operations to 0.8 M, but a time required to generate the fisheye image may also be drastically reduced.

Figure 7:
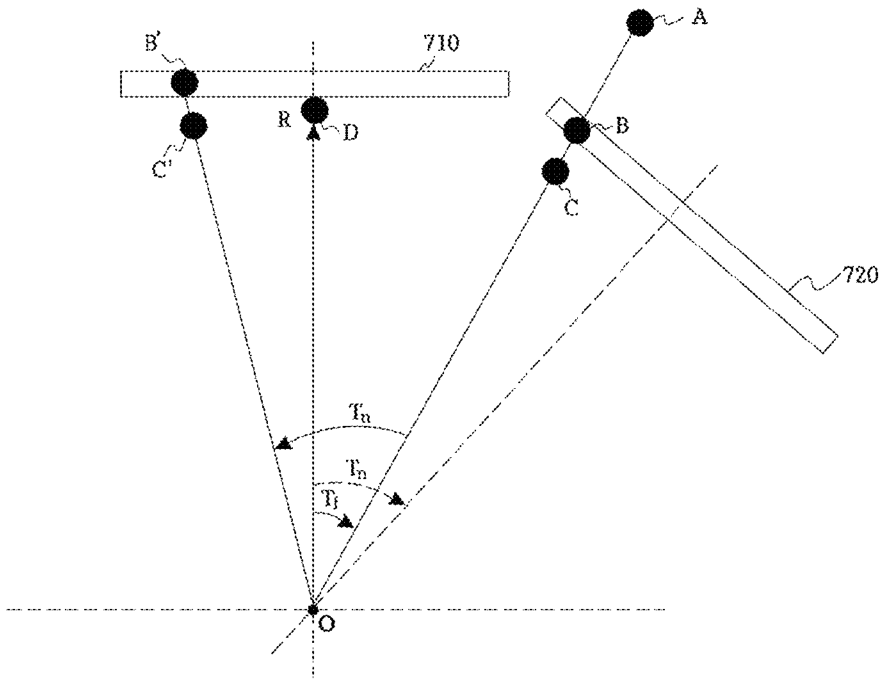
FIG. 7 is a diagram illustrating another embodiment for describing that a hemispherical fisheye image is generated by the fisheye image generator of the PTZ camera operating system according to the present invention.

FIG. 7 is a diagram illustrating another embodiment for describing that a hemispherical fisheye image is generated by the fisheye image generator of the PTZ camera operating system according to the present invention. The fisheye image generator 121 provides a fisheye image generated by extracting predetermined pixels from individual images in the motion range captured by the PTZ camera.

Referring to FIG. 7, coordinates of a point A at a tilt angle $T_f$ from the center O of the fisheye image may be matched to coordinates of a point B of an image 720 of the PTZ camera having a tilt angle $T_n$. To obtain the coordinates of the point B, a sphere whose radius is the focal length R of the PTZ camera is considered.

When a reference point D at a center of an image 710 of the PTZ camera having a tilt angle of 0 is rotated by a tilt angle $T_f$ of the fisheye image, a point C on the sphere facing the point A may be obtained. When the point C is inversely rotated by a tilt angle $T_n$ of the image 720 of the PTZ camera, coordinates of a point C' may be obtained in an image of the PTZ camera, and when this point is projected onto the image 710 of the PTZ camera having the tilt angle of 0, coordinates of B' may be obtained.

The coordinates of B' are the same in the image 720 of the PTZ camera having the tilt angle $T_n$, and thus the coordinates of B' of the image 720 of the PTZ camera having the tilt angle of $T_n$ may be matched or mapped to the point A at the tilt angle $T_f$ in the fisheye image. When the image of the PTZ camera is mapped for all points in the fisheye image, the fisheye image may be formed at high speed while using fewer computing resources.

Hereinafter, rotation transformation considering both a pan angle and a tilt angle is described. First, in a reference coordinate system where both the pan angle and the tilt angle are 0, coordinates (R, 0, 0) of a reference point A at a center of an image of the PTZ camera may be obtained using a focal length R of the following Formula 4.

$$R=(H/2)\tan(\omega/2) \quad \text{(Formula 4)}$$

Here, ω denotes an angle of view of the PTZ camera, and H denotes an image length in a direction of the angle of view.

In a fisheye coordinate system whose origin is a center of a fisheye image, when coordinates of a point representing a point A are $F_x$ pixels in a horizontal axis and $F_y$ pixels in a vertical axis, a pan angle $P_f$ and a tilt angle $T_f$ may be obtained using the following Formula 5.

$$P_f=\arctan(F_y/F_x) \quad \text{(Formula 5)}$$
$$T_f=T_m*(d/R_f)$$

Here, $T_m$ denotes a tilt range, d denotes a pixel distance from the origin to a point P, and $R_f$ denotes a pixel distance corresponding to a radius of the fisheye image. The tilt range $T_m$ may be obtained by adding half the FOV to a maximum FOV of the fisheye camera or a maximum tilt value of the PTZ camera.

Meanwhile, a rotation transformation matrix W for a point rotated by the pan angle $P_f$ and the tilt angle $T_f$ may be obtained using the following Formula 6.

$$W=\begin{bmatrix}\cos(P_f) & -\sin(P_f) & 0\\ \sin(P_f) & \cos(P_f) & 0\\ 0 & 0 & 1\end{bmatrix}\begin{bmatrix}\sin(T_f) & 0 & \cos(T_f)\\ 0 & 1 & 0\\ -\cos(T_f) & 0 & \sin(T_f)\end{bmatrix} \quad \text{(Formula 6)}$$
$$=\begin{bmatrix}\cos(P_f)\sin(T_f) & -\sin(P_f) & \cos(P_f)\cos(T_f)\\ \sin(P_f)\sin(T_f) & \cos(P_f) & \sin(P_f)\cos(T_f)\\ -\cos(T_f) & 0 & \sin(T_f)\end{bmatrix}$$

Coordinates of a point C obtained by rotating a reference point D (R, 0, 0) by the pan angle $P_f$ and the tilt angle $T_f$ of the point A may be obtained by applying the matrix W of Formula 6. In other words, coordinates (x, y, z) of the point C after rotation transformation may be calculated as in the following Formula 7.

$$\begin{bmatrix}x\\ y\\ z\end{bmatrix}=WA \quad \text{(Formula 7)}$$

-continued $$=\begin{bmatrix}\cos(P_f)\sin(T_f) & -\sin(P_f) & \cos(P_f)\cos(T_f)\\ \sin(P_f)\sin(T_f) & \cos(P_f) & \sin(P_f)\cos(T_f)\\ -\cos(T_f) & 0 & \sin(T_f)\end{bmatrix}\begin{bmatrix}R\\ 0\\ 0\end{bmatrix}$$

The image of the PTZ camera is captured in a range of a preset certain pan angle and tilt angle, and thus does not usually match the pan angle and the tilt angle of the point A. Therefore, among a plurality of images of the PTZ camera, an nth image having a pan angle $P_n$ and a tilt angle $T_n$ closest to the pan angle $P_f$ and the tilt angle $T_f$ of the point A is found.

To obtain coordinates corresponding to the point A in this image, the coordinates (x, y, z) of the point C are reversely rotated by the pan angle $P_n$ and the tilt angle $T_n$. A reverse rotation matrix $C_R$ is the transpose of the matrix of Formula 6, and thus is as in the following Formula 8.

$$C_R=W^T \quad \text{(Formula 8)}$$
$$=\begin{bmatrix}\cos(P_n)\sin(T_n) & \sin(P_n)\sin(T_n) & -\cos(T_n)\\ -\sin(P_n) & \cos(P_n) & 0\\ \cos(P_n)\cos(T_n) & \sin(P_n)\cos(T_n) & \sin(T_n)\end{bmatrix}$$

Coordinates (x', y', z') of a point C' obtained by reversely rotating the point C (x, y, z) may be obtained using the following Formula 9.

$$\begin{bmatrix}x'\\ y'\\ z'\end{bmatrix}=X'=C_RX \quad \text{(Formula 9)}$$
$$=\begin{bmatrix}\cos(P_i)\sin(T_i) & \sin(P_i)\sin(T_i) & -\cos(T_i)\\ -\sin(P_i) & \cos(P_i) & 0\\ \cos(P_i)\cos(T_i) & \sin(P_i)\cos(T_i) & \sin(T_i)\end{bmatrix}\begin{bmatrix}x\\ y\\ z\end{bmatrix}$$

In the image of the PTZ camera having the pan angle $P_n$ and the tilt angle $T_n$, a position (i, j) of the image may be obtained using the following Formula 10.

$$Img(i,j):\ i=R\times\frac{y'}{x'},\ j=R\times\frac{z'}{x'} \quad \text{(Formula 10)}$$

In summary, the coordinates (i, j) obtained using Formula 10 in the nth image having the pan angle $P_n$ and the tilt angle $T_n$ closest to the pan angle $P_f$ and the tilt angle $T_f$ of the point A may be mapped to a point ($F_y$, $F_x$) obtained by capturing A at a position of the pan angle $P_f$ and the tilt angle $T_f$ in the fisheye image.

According to an additional aspect, the entire surveillance area may be divided into partial surveillance areas having a pan angle smaller than the horizontal FOV of the PTZ camera and a tilt angle smaller than the vertical FOV thereof. When the pan angle and the tilt angle are changed to face a center of each divided partial surveillance area 720, and the areas are captured, it is possible to obtain a plurality of images 710 and 720 for the entire surveillance area having overlapping parts. In this instance, areas having small tilt angles corresponding to a central part of the fisheye image have large overlapping parts, and thus the number of captured images may be reduced by increasing a pan angle interval.

The fisheye image storage controller 122 performs a control operation to store a hemispherical fisheye image generated by the fisheye image generator 121 in the non-volatile memory 110.

The surveillance area setting UI output controller 123 performs a control operation so that the surveillance area setting UI for setting the surveillance area is output through the output unit 130. When the surveillance area setting UI is output to the screen by the surveillance area setting UI output controller 123, as described above, the surveillance area setting UI outputs the hemispherical fisheye image stored in the nonvolatile memory 110 to the screen through the display unit 130, and an area selected through user operation input by the user input unit 140 from the hemispherical fisheye image output to the screen is set as the surveillance area.

The coordinate mapping processor 124 generates a PTZ camera driving table by mapping fisheye image coordinates included in the surveillance area set by the surveillance area setting UI to PTZ camera driving coordinates.

For example, the coordinate mapping processor 124 may be implemented so that the surveillance area set by the surveillance area setting UI is set as n individual surveillance areas, and the PTZ camera driving table is generated by mapping fisheye image coordinates included in each individual surveillance area to respective driving coordinates (for example, center coordinates of the individual surveillance area) for panning/tilting the PTZ camera to capture each individual surveillance area.

The camera driving table storage controller 125 performs a control operation to store the PTZ camera driving table generated by the coordinate mapping processor 124 in the nonvolatile memory 110.

Then, the PTZ camera operating system according to the present invention drives the PTZ camera by referring to the driving coordinates stored in the PTZ camera driving table stored in the nonvolatile memory 110 to capture a surveillance image for the surveillance area set by the surveillance area setting UI.

By such implementation, the present invention may facilitate a system configuration and reduce system operating costs since the surveillance area may be easily and simply set and monitored through the user-intuitive surveillance area setting UI capable of setting the surveillance area from the hemispherical fisheye image generated using individual images within the motion range captured by the PTZ camera without using the fisheye camera.

Meanwhile, according to an additional aspect of the present invention, the processor 120 may further include a camera driving controller 126. The camera driving controller 126 controls operation of the PTZ camera 300.

For example, the camera driving controller 126 captures individual images of each driving area while panning and tilting the PTZ camera 300 in a zoom state at a specific magnification within the motion range.

The fisheye image generator 121 generates a hemispherical fisheye image as described above using individual images of each driving area within the motion range captured by the PTZ camera 300, and the surveillance area setting UI sets an area selected from the hemispherical fisheye image through user operation as a surveillance area.

By such implementation, the present invention may easily and simply set the surveillance area through the user-intuitive surveillance area setting UI capable of setting the surveillance area from the hemispherical fisheye image generated using individual images within the motion range captured by the PTZ camera without using the fisheye camera.

Meanwhile, according to an additional aspect of the present invention, the processor 120 may be implemented to capture a surveillance area image in real time by performing driving control to pan/tilt the PTZ camera to the surveillance area set by the surveillance area setting UI through the camera driving controller 126.

By such implementation, the present invention may facilitate a system configuration and reduce system operating costs since the surveillance area may be easily and simply set and monitored through the user-intuitive surveillance area setting UI capable of setting the surveillance area from the hemispherical fisheye image generated using individual images within the motion range captured by the PTZ camera without using the fisheye camera.

Meanwhile, according to an additional aspect of the present invention, the processor 120 may further include an event detector 127. The event detector 127 detects a motion event by analyzing in real time a surveillance area image captured in real time by the PTZ camera 300 panned and tilted in real time in the surveillance area.

In this instance, when the motion event is detected by the event detector 127, the processor 120 may be implemented to pan-tilt the PTZ camera and zoom the PTZ camera at a preset magnification at the same time using the camera driving controller 126, thereby capturing an enlarged image centered on coordinates where the motion event is detected.

By such implementation, the present invention may easily and simply set and monitor the surveillance area through the user-intuitive surveillance area setting UI capable of setting the surveillance area from the hemispherical fisheye image generated using individual images within the motion range captured by the PTZ camera without using the fisheye camera, and may detect a motion event in the surveillance area, enlarge a part where the motion event is detected, and capture a surveillance image. In this instance, implementation may be performed to protect privacy by partially or completely masking a moving object included in the surveillance image.

As described above, the present invention may facilitate a system configuration and reduce system operating costs since the surveillance area may be easily and simply set and monitored through the user-intuitive surveillance area setting UI capable of setting the surveillance area from the hemispherical fisheye image generated using individual images within the motion range captured by the PTZ camera without using the fisheye camera.

The various embodiments disclosed in this specification and drawings are merely presented as specific examples to aid understanding, and are not intended to limit the scope of the various embodiments of the present invention.

Accordingly, the scope of the various embodiments of the present invention should be interpreted as including all changed or modified forms derived based on the technical idea of the various embodiments of the present invention in addition to the embodiments described herein.

The present invention may be industrially used in the field of technology related to a PTZ camera and application technology thereof.

What is claimed is:

1. A pan-tilt-zoom (PTZ) camera operating system comprising:

- a nonvolatile memory configured to store a hemispherical fisheye image generated using individual images within a motion range captured by a PTZ camera;
- a processor configured to execute a surveillance area setting user interface (UI) for setting a surveillance area using the hemispherical fisheye image stored in the nonvolatile memory;
- a display unit configured to output a surveillance area setting UI executed by the processor to a screen;

a user input unit comprising at least one of a keyboard, a mouse, and a touch panel, wherein the user input unit is configured to receive input of a user operation for setting the surveillance area;

a communication unit configured to communicate with the PTZ camera, wherein the surveillance area setting UI outputs the hemispherical fisheye image stored in the nonvolatile memory to the screen, and sets, as the surveillance area, an area selected through the user operation from the hemispherical fisheye image output to the screen, wherein the processor comprises:

a fisheye image generator configured to generate a hemispherical fisheye image using individual images within the motion range captured by the PTZ camera;

a fisheye image storage controller configured to perform a control operation to store the hemispherical fisheye image generated by the fisheye image generator in the nonvolatile memory;

a surveillance area setting UI output controller configured to perform a control operation to output the surveillance area setting UI for setting the surveillance area through the display unit;

a coordinate mapping processor configured to generate a PTZ camera driving table by mapping fisheye image coordinates included in the surveillance area set by the surveillance area setting UI to PTZ camera driving coordinates; and a camera driving table storage controller configured to perform a control operation to store the PTZ camera driving table generated by the coordinate mapping processor in the nonvolatile memory.

2. The PTZ camera operating system according to claim 1, wherein the surveillance area setting UI sets the surveillance area using a grid setting method of overlaying grids for selection of the surveillance area through a user operation on the hemispherical fisheye image and setting, as the surveillance area, a fisheye image area including the grids overlayed on the hemispherical fisheye image.

3. The PTZ camera operating system according to claim 1, wherein the surveillance area setting UI sets the surveillance area using a polygon setting method of overlaying a polygon for selection of the surveillance area through a user operation on the hemispherical fisheye image and setting, as the surveillance area, a fisheye image area in the polygon selected by moving vertices of the polygon.

4. The PTZ camera operating system according to claim 1, wherein the processor further comprises a camera driving controller configured to control driving of the PTZ camera.

5. The PTZ camera operating system according to claim 4, wherein the camera driving controller captures individual images of each driving area while panning and tilting the PTZ camera in a zoom state at a specific magnification within the motion range.

6. The PTZ camera operating system according to claim 5, wherein the fisheye image generator combines individual images of each driving area, and distorts a planar image obtained by connecting overlapping areas of the individual images using an inverse matrix of a fisheye image generation matrix to generate a hemispherical fisheye image.

7. The PTZ camera operating system according to claim 4, wherein the processor captures a surveillance area image in real time by performing a driving control to pan/tilt the PTZ camera to the surveillance area set by the surveillance area setting UI through the camera driving controller.

8. The PTZ camera operating system according to claim 7, wherein the processor further comprises an event detector configured to detect a motion event by analyzing in real time a surveillance area image captured in real time by the PTZ camera panned and tilted in real time in the surveillance area.

9. The PTZ camera operating system according to claim 8, wherein the processor pan-tilts the PTZ camera and zooms the PTZ camera at a preset magnification at the same time using the camera driving controller, thereby capturing an enlarged image centered on coordinates where a motion event is detected when the motion event is detected by the event detector.

* * * * *